Oct. 12, 1965   M. H. LILL   3,210,857
SUSPENSION HEIGHT GAUGE FOR VEHICLES
Filed Oct. 15, 1962   2 Sheets-Sheet 1
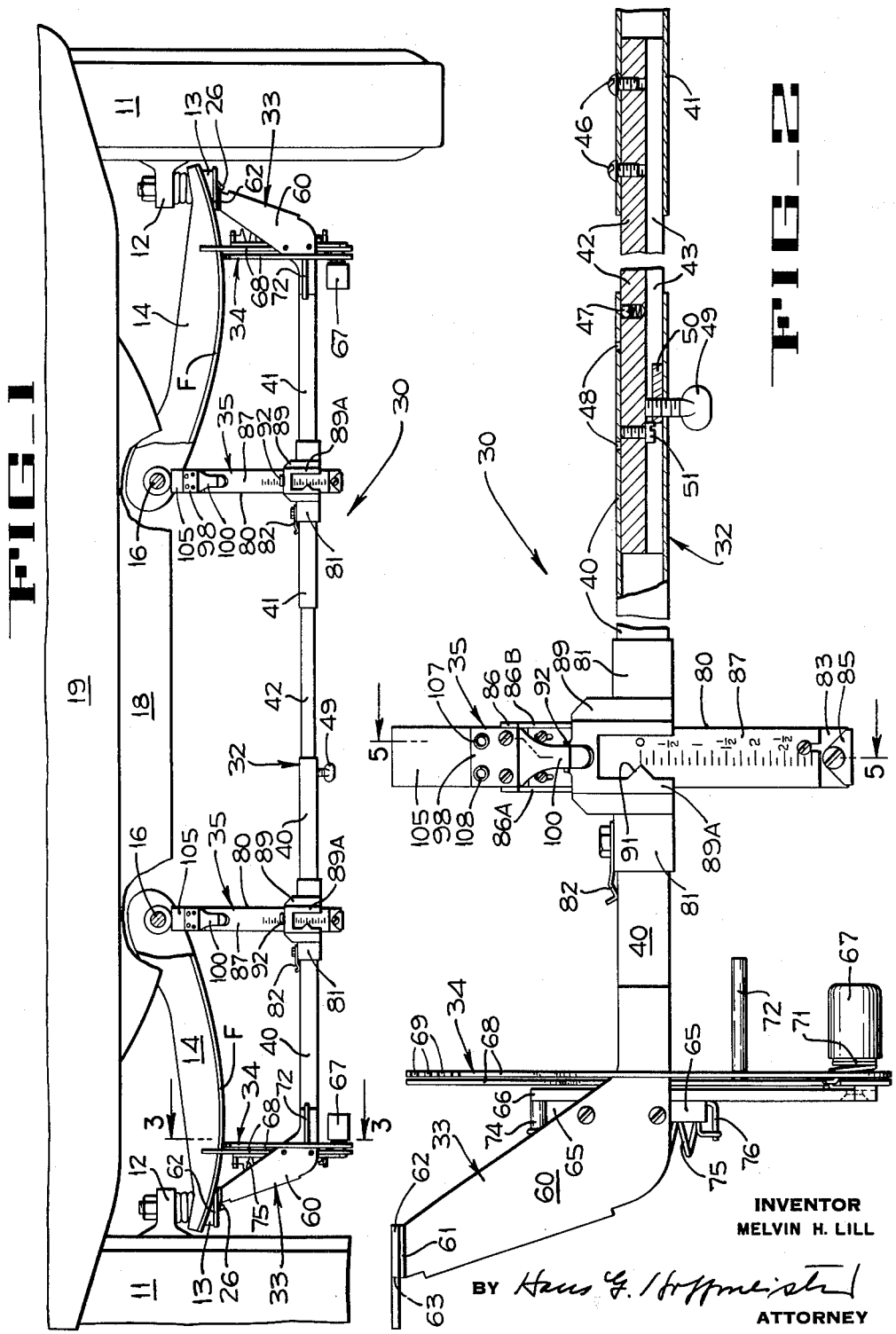
INVENTOR
MELVIN H. LILL
BY Hans G. Hoffmeister
ATTORNEY Oct. 12, 1965 M. H. LILL 3,210,857
SUSPENSION HEIGHT GAUGE FOR VEHICLES
Filed Oct. 15, 1962 2 Sheets-Sheet 2
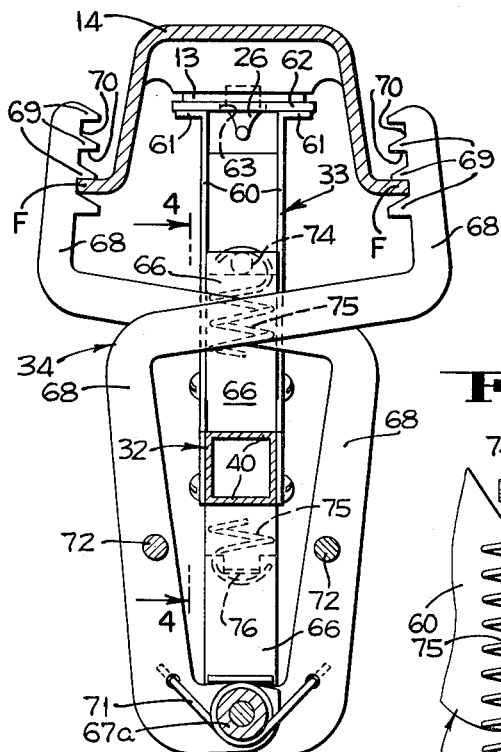
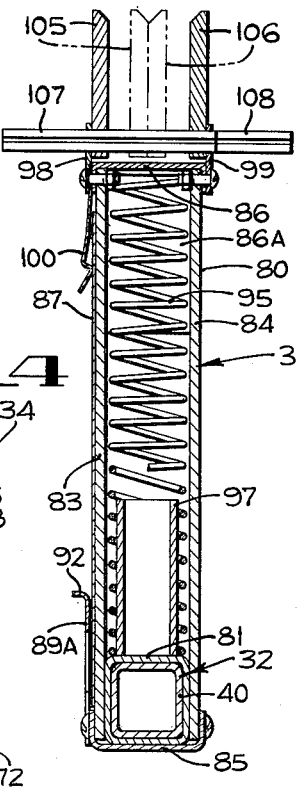
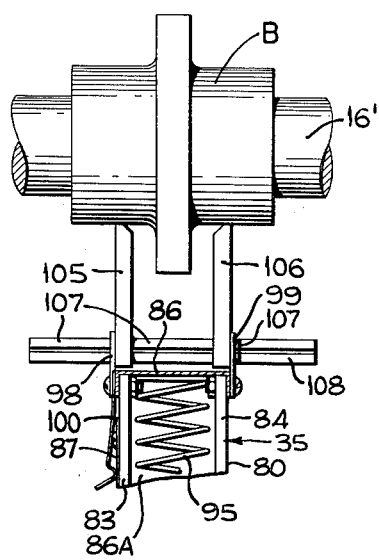
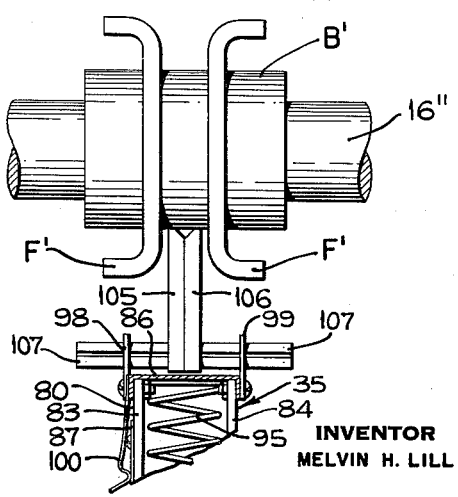
INVENTOR
MELVIN H. LILL
BY Hans G. Hoffmeister
ATTORNEY

United States Patent Office 3,210,857
Patented Oct. 12, 1965

3,210,857
SUSPENSION HEIGHT GAUGE FOR VEHICLES
Melvin H. Lill, Lansing, Mich., assignor to FMC Corporation, San Jose, Calif., a corporation of Delaware
Filed Oct. 15, 1962, Ser. No. 230,589
11 Claims. (Cl. 33—180)

The present invention pertains to suspension height gauges for vehicles and more particularly to gauges of the type used to measure the height of the front suspension of those automobiles or other vehicles having torsion bar suspension systems.

Since the advent of torsion bar suspension systems for general usage in passenger vehicles and trucks, various gauges have been proposed for measuring the height of the front end suspension and checking the level of the suspension in particular vehicles. Briefly, a torsion bar suspension system comprises a rigid torsion bar adjustably fixed at one end to the frame of a vehicle, and a control arm which is rigidly attached to the other end of the torsion bar and has an end portion pivotally connected to one of the front wheels of the vehicle for movement therewith. Two such torsion bars and control arms are, therefore, required to adjustably support the front portion of the body of the vehicle. This front body portion is directly supported only by the torsion bars which must twist as the body moves toward the ground when the vehicle is bounced upon its wheels. This is due to the fact that the wheels move upward relative to the vehicle body and, in so doing, cause the control arms to pivot about their rigid connection with the torsion bars, thus causing the torsion bars to twist as the suspension height changes. The measurable suspension of the vehicle, therefore, consists of the distance which the vehicle frame or body portion is supported above the ground or above some other point fixed with reference to the ground, and it is determined by the amount of twist imposed upon the torsion bars.

In checking the suspension height of a vehicle using the torsion bar suspension system, it is important to gauge the relative height of the torsion bar above some fixed reference point so as to determine at what height the vehicle is "riding" above the road or ground surface and to level the front suspension of the vehicle before adjusting the caster and camber. In addition, it is also of special importance to determine the relative suspension height of one side of the vehicle with respect to the other side to assure that the vehicle is level and is not tilted so as to cause undue wear on one of the wheels and its associated parts.

The basic requirements of a gauge for measuring and checking the above mentioned suspension factors are that it be easy to install and operate, that it give quick and accurate readings, and that it be flexible so as to fit a wide variety of different vehicles and substantially all of the commercial vehicles and trucks utilizing torsion bar suspension systems. The suspension height gauges which have heretofore been utilized in the industry have lacked one or more of these requirements.

It is an object of the present invention to provide a suspension height gauge for vehicles which can be readily adjusted to accommodate vehicles of varying width and designs.

Another object of this invention is to provide a gauge having spring supported gauging means which will accommodate various heights of vehicle lower control arms and remain in operative position as the control arms are pivoted downwardly a substantial extent when the car is jounced prior to the gauging operation.

Another object of this invention is to provide a suspension height gauge which is convenient for one man to apply, adjust, and read, and one which will remain in place during correction and be readable continuously while correction of the vehicle proceeds.

Another object is to provide a quick and convenient means of adjusting the probing contact elements of the gauge so that they may enter either between or around various obstructions found at the proper gauging points on the torsion bars.

Another object of the present invention is to provide an improved suspension height gauge which can be quickly installed and read without undue cumbersome manipulation by the operator.

Other objects and advantages of the present invention will become apparent from the following description and the accompanying drawings, in which:

FIGURE 1 is a diagrammatic front elevation of an automotive vehicle with the suspension height gauge of the present invention positioned in operative position thereon.

FIGURE 2 is an enlarged elevation of a portion of the gauge of FIGURE 1 with parts thereof being in section for the purpose of clarity.

FIGURE 3 is an enlarged vertical section taken along the lines 3—3 of FIGURE 1.

FIGURE 4 is a section taken along lines 4—4 of FIGURE 3.

FIGURE 5 is an enlarged section taken along lines 5—5 of FIGURE 2, but showing the probe assembly in an alternate position with respect to the base bar and illustrating, in phantom line, an alternate position for the variable probe blades.

FIGURE 6 is a fragmental diagrammatic elevation of a portion of the probe assembly of FIGURE 5 illustrating the contact between the probe blades and the proper gauging point on the lower control arm for one type of automotive vehicle.

FIGURE 7 is a fragmental diagrammatic elevation of a portion of the probe assembly of FIGURE 5, similar to FIGURE 6, but showing the contact between the probe blades and the proper gauging point on the lower control arm for another type of automotive vehicle.

Referring now more particularly to the drawings, which disclose an embodiment of the present invention, the gauge 30 there shown is adapted to be positioned beneath the front suspension system of those vehicles using a torsion bar suspension system. An automobile (FIG. 1) of this general type includes front tires 11 which are connected to a pair of lower control arms 14 by means of steering knuckle assemblies 12 having lower ball joint housings 13. Each control arm is rigidly fixed to the forward end of a torsion bar 16, the rearward end of which is rigidly attached to the frame of the car (not shown). The control arms may be additionally supported at the forward end of the car in a frame member 18 located just rearwardly of the front bumper 19.

The suspension height gauge 30 of the present invention is utilized at the described front suspension system, being positioned transversely of the vehicle with its ends beneath the lower ball joint housings 13 on either side of the vehicle. Specifically, each end of the gauge is adapted to abut against the under-surface of the associated lower ball joint housing.

The gauge 30 comprises generally an adjustable base bar 32 extending across the width of the vehicle, abutment brackets 33 at each end of the base bar to provide accurate measuring points, a pair of adjustable clamp members 34 for securing the gauge to the lower control arms 14 of the vehicle, and spring mounted probe assemblies 35 for measuring the vehicle suspension and gauging the relative suspension of each side of the vehicle.

Referring now to FIGS. 1 and 2, the base bar 32 is seen to comprise two spaced tubular members 40 and 41 of rectangular cross-sectional configuration interconnected by a telescoping rod 42 of similar cross-sectional configuration which is adapted to slide within one of the tubular members. The members of this structure can be locked rigidly to each other to provide an accurate base line for measuring purposes. The telescoping rod 42 is a solid bar which is provided with a longitudinal slot 43 extending along its entire length. One end of the rod 42 is rigidly attached to the tubular member 41 by means of fasteners 46 while the other end is adjustable within tubular member 40. The adjusted positions of the member 40 along the rod 42 are determined by a spring-urged ball 47 which is disposed in a recess in the rod 42 and is adapted to snap into one of a plurality of holes 48 provided in one side of the tubular member 40. The selective positioning of the ball 47 in any one of the holes automatically sets the width of the gauge for use with certain automotive vehicles. In addition, to provide a positive and rigid connection between the rod 42 and tubular member 40, and to preserve the accuracy of the gauge reading, a thumb screw 49 is inserted through the tubular member to extend through a specially mounted nut 50 in the slot 43 of the rod 42. The thumb screw can therefore be tightened against the rod at the bottom of the slot 43 to lock the parts together. A screw 51 is threaded into the bottom portion of the slot 43 to provide a maximum width setting when it abuts against the nut 50, as illustrated in FIGURE 2, and to act as a stop in preventing accidental separation of the rod 42 and the tubular member 40 during the use of the gauge. The minimum width setting is attained when the tubular members 40 and 41 abut.

When the device is to be adjusted for various widths of vehicles to be checked, the thumb screw 49 is loosened and the member 40 is moved outwardly along the rod 42. When the correct position is attained, by means of the spring-mounted ball 47 or otherwise, the thumb screw is tightened again to securely fasten the tubular member 40 to the rod.

Each abutment bracket 33 includes a pair of spaced plates 60 (FIG. 3) which are securely fastened to and form an extension of the adjacent tubular member 40 or 41. The plates are parallel to the tubular members 40 and 41 and extend generally transversely of or upwardly therefrom. The upper end of the plates 60 are flanged outwardly at 61 to support a contact plate 62 which is welded to flanges 61 and extends in a direction parallel to the base bar 32. The contact plate is adapted to be received beneath and in abutment with the lower ball joint housing 13 of the knuckle assembly 12, as is clearly evident from FIGURES 1 and 3. In addition, the contact plate is provided, at one end, with a slot 63 (FIG. 3) which receives a grease fitting 26 of the type usually present on the lower portion of the ball joint housing.

The gauge 30 is adapted to be supported upon the vehicle by means of the clamp members 34 which grip the lower control arms 14. Each clamp member (FIGS. 3 and 4) generally comprises a flat, vertically slidable bar 66 which is slidably disposed in a guide opening defined by the two side plates 60, the forward end of the adjacent tubular member 40 or 41, and a channel bracket 65 that is secured between plates 60. A knob 67 is rigidly secured by a screw to the lower end of slide bar 66, and a pair of hook members 68 are pivotally mounted upon a reduced diameter portion 67a of knob 67. As best seen in FIGURE 3, the hook members cross near their mid points, and they are provided at their upper ends with a plurality of gripping teeth 69 forming pockets 70. A torsion spring 71 is wound around the reduced portion 67a of knob 67 and secured to both of the hook members so as to urge the lower portions of the members apart and to urge the upper portions, including the gripping teeth 69, toward each other to provide a positive clamping action upon the flanges F found on opposite sides of the lower control arms 14 (FIG. 3). A laterally projecting gripper pin 72 (FIGS. 2 and 3) is provided on each of the hook members so that the mechanic can, with one hand, grip the two pins 72, and squeeze them toward each other and move the upper portions of the clamp away from each other to open the clamp.

The upper end of the slide bar 66 is provided with a pin 74 to receive the upper end of a tension spring 75 which is anchored at its lower end in an arm 76 projecting from the fixed channel bracket 65. The spring 75 urges the slide bar and its associated hook members 68 downwardly in the direction of the base bar 32, the upper edge of channel bracket 65 limiting the downward movement of the pin 74.

When the gauge is mounted in operative position with the contact plates 62 abutting the ball joint housings 13, the positioning of the hook members 68 upon the flanges F may cause the pin 74 to move away from the channel member, as best shown in FIGURE 4. Once the gauge is hooked onto the vehicle the springs 75 will exert a constant force urging the gauge upwardly.

It will be appreciated that the two clamping assemblies 34 are conveniently located at the longitudinal ends of the base bar 32 of the gauge. This permits easy installation of the gauge even when the automobile or other vehicle is resting upon the shop floor or ground surface. The operator or mechanic merely needs to reach behind the tire, grip the projecting pins 72 between thumb and forefinger, and squeeze inwardly against the urging of the torsion spring 71 to bring the hook members 68 into surrounding engagement with the flanges F on the lower edges of the control arm. Since the gripping members are slidably mounted for vertical movement upon the base bar 32, the clamping assemblies are readily adjustable for different types of vehicles. That is to say, they may be moved upwardly or downwardly with respect to the fixed contact point where the contact plate 62 abuts the lower ball joint housing so that they will securely fit upon lower control arms whose dimensions or shape may vary widely. In the further event that the control arm is one which has its flanges F located at different elevations, i.e., where the control arm is asymmetrical in cross-section, each hook member 68 is provided with a plurality of gripping teeth 69 and pockets 70 so that the gauge will hang straight by placing the flanges in non-opposite pockets.

The measurements with the gauge are made by means of the probe assemblies 35, there being two such assemblies for the two torsion bars in a vehicle front suspension system. Each probe assembly includes a tubular slider 81 which is slidable over the associated tubular member 40 or 41. Mounted on the top of the slider is a friction lock in the form of a spring 82 (FIG. 2) which has an end portion in frictional contact with the tubular member to maintain the probe assembly in a set position thereon. Slidably mounted upon the slider 81 is a probe carrier 80 which includes two vertically extending plates 83 and 84, such plates being joined at their bottom portions by a spacer member 85 (FIG. 5) and, at their upper portions by a spacer 86 to prevent their separation. A scale plate 87 is adjustably mounted on the front plate 83 so that the relative height of the torsion bar can be measured with respect to the fixed reference point at the contact plate 62, as will presently be made clearer. Welded to the exterior of the tubular slider is a fabricated guide member 89 which has a central portion 89A (FIGS. 2 and 5) which coacts with slider 81 to provide a guide slot in which plate 83 is slidably disposed. An aperture is provided in the offset portion 89A to expose a portion of the scale, and a reading pointer 91 is formed on portion 89A to indicate the particular scale reading. At the upper end of the guide member 89 is a projecting lip 92. The plates 83 and 84 are urged upwardly into the position of FIGURE 5 by a coil spring 95 which extends between the top surface of the slider 81 and the spacer member 86 attached to the upper end of the plates 83 and 84. The spring is guided and prevented from buckling by two plates 86A and 86B (FIG. 2) that extend downwardly from opposite sides of spacer 86 and by a tubular stem 97 (FIG. 5) which is fixed to and projects upwardly from the top surface of the slider 81. Overlapping the upper ends of the plates 83 and 84 and projecting thereabove are a pair of aligned brackets 98 and 99, the front bracket 98 securing a spring latching member 100 to the upper end of the scale plate 83. The latching member 100 is adapted to resiliently engage the lip 92 to retain the probe assembly in its lowermost position with the pointer reading "zero" on the scale, as seen in FIGURE 2. This position is the one which is maintained during the initial positioning of the gauge upon the vehicle, the latch 100 not being released from lip 92 until the measurements are to be taken.

Contact between the probe assembly and the proper gauging point on the vehicle, such as the lower control arm pivot point bushing housing or the torsion bar housing, is accomplished with two probe blades 105 and 106 which are mounted upon the brackets 98 and 99, respectively. An important feature of the present invention is that these probe blades are adjustable relative to each other laterally of the probe assembly, that is, in a direction perpendicular to the base bar 32. In order to accomplish this, the probe blades 105 and 106 are fixed to cylindrical roll pins 107 and 108 respectively, which extend therethrough so that end portions of the pin project from the opposite sides of the probe blade. In addition, there is a circular opening provided in each of the blades to slidably receive one projecting end of the pin which is fixed to the other probe blade when the blades are placed in confronting relationship. That is to say, the probe blade 105 slidably receives one projecting end of the pin 108, while the probe blade 106 slidably receives one projecting end of the pin 107. Each of the pins is slidably disposed in aligned apertures in the brackets 98 and 99.

One important feature of the adjusting means of the probe blades 105, 106 is that adjustments can be handled quite easily by merely pushing with the thumb and forefinger on the oppositely projecting ends of the non-aligned pins 107 and 108 to either straddle or to enter an obstructing member on the lower control arm or its bushing housing at the torsion bar pivot point. This simple, yet effective, method of rapidly changing the position of the probing elements of the gauge is of great importance to the mechanic who, once the gauge is on the vehicle and it is found that it is not making proper contact, might not be able to conveniently shift the blades if various prior adjusting techniques had been utilized due to the various obstructions on the vehicle itself and the cramped working conditions. The importance of the feature is readily apparent when the vehicle tires are resting on the floor surface during checking, since the mechanic will be able to do little more than insert one arm under the vehicle if he is required to do any adjusting. The simple thumb-finger pressure applied at the bottom of the blades permits rapid adjustment for different encountered conditions despite the fact that the mechanic does not see the critical area.

An additional feature of the adjusting means is that it is compact and does not take up much room on the probe assemblies 35. This permits the probe assemblies full travel transversely of the guage for maximum and minimum measurements even if the vehicle is resting upon the floor surface.

FIGURE 5 shows the two extreme positions of the probe blades, the full lines illustrating the open position and the phantom lines illustrating the closed position. FIGURES 6 and 7 illustrate two common applications of these two positions of the adjustable probe blades. In FIGURE 6, a trosion bar 16' is engaged in a bushing housing B within the lower control arm. Since the bushing B has an obstruction centrally thereof, the probe blades are spaced so as to be received on either side of the obstruction. In FIGURE 7, the bushing housing B' is of another type found on certain automotive vehicles whereby the lower control arm, that is associated with a torsion bar 16", is narrow and includes a pair of oppositely extending flange portions F' forming a different type of obstruction for the probe blades. In this case the probe blades are pushed together to form a single blade which contacts the bushing between the flanges. It will be appreciated that other positions of the probe blades between the two extreme positions shown in FIGURES 6 and 7 can be realized with the adjusting pins 107, 108 to meet other particular vehicle design problems.

To operate the suspension height gauge 30, the mechanic first places the gauge beneath the vehicle. One of the important features of the present invention is that the gauge may be used even on compact cars with small tire profiles with the car resting upon the ground. As previously mentioned, the probe assemblies 35 are initially in their latched position of FIGURE 2. The mechanic first adjusts the width of the gauge with the thumb screw 49 in the manner previously described and then places the contact plates 62 beneath the lower ball joint housings 13 and clamps the hook members 68 upon the lower control arms in suitable positions by first squeezing and then releasing the gripper pins 72.

Once the gauge is secured upon the vehicle, the sliders 81 are adjusted on the tubes 40 and 41 to position the probes directly below the torsion bars. The latches 100 are then removed from restraining lips 92 and the springs 95 urge the probe assemblies 35 upward into contact with the bushing housing or other proper gauging point on the vehicle. The gauge may then be easily read with the pointer 91 indicating the vertical distance between the contact points at the leading edges of the probe blades 105, 106 and the lower surface of the lower ball joint housings at the contact plates 62.

In order to get an accurate reading on the scales of the probe assemblies, the front end of the vehicle should be jounced while the gauge is attached so that the vehicle will settle in its normal running position. The gauge 30 of the present invention has been specially designed so that no part of it will hit the ground or other surface upon which the vehicle is resting regardless of how vigorously the vehicle is bounced up and down.

It can be seen that the device of the present invention provides an improved suspension height gauge which can be readily attached and adjusted, by a single operator, upon a vehicle which may be resting upon a ground level surface. The gauge is quickly and readily adjustable so as to be usable upon a wide variety of vehicles in general commercial usage. It is provided with a flexible probe assembly which can either extend around an obstruction or enter into a narrow space. When the car is jounced prior to the reading of the scales, the gauge will not hit the tire supporting surface. By means of two separate probe assemblies, one for each side of the vehicle, the relative suspension of each side of the vehicle can readily be determined by reading each scale and observing the difference in the readings. In addition, any adjustments made to the torsion bars can readily be carried out while the gauge remains in place, after which, the gauge may again be read to determine whether or not the adjustments have brought the vehicle to the proper suspension height. A data sheet or other information will, of course, be necessary to determine the proper suspension height for the particular vehicle to be gauged.

While one embodiment of the present invention has been shown and described, it will be understood that various changes and modifications may be made therein without departing from the spirit of the invention or the scope of the appended claims.

The invention having thus been described, what is believed to be new and desired to be protected by Letters Patent is:

1. A vehicle suspension height gauge for use with a vehicle having a torsion bar suspension system, said gauge comprising a base bar, means for mounting said base bar in a predetermined position on the vehicle to be gauged, a slidable scale member mounted upon said base bar for movement transversely thereof, a pair of opposed probe blades at one end of said scale member for contact with the proper gauging point associated with said torsion bar suspension system, and means for adjusting said probe blades relative to each other so that they may assume a first spaced position for straddling obstructions or a second abutting position to be received within a narrow passage on said vehicle.

2. A vehicle suspension height gauge for use with a vehicle having a torsion bar suspension system, said gauge comprising a base bar, a rigid bracket extending laterally of and from one end of said base bar for fixing said base bar in a predetermined position on the vehicle to be gauged, clamping means adjustably mounted on the base bar for securing the gauge to the vehicle, and measuring means slidably mounted upon said bar for movement transversely thereof, said measuring means including two probe blades for contact with a gauging point associated with said torsion bar suspension system, said blades being adjustable relative to each other in a manner wherein they can be moved apart to straddle an obstruction or moved together to form a single blade receivable within a narrow passage.

3. A vehicle suspension height gauge for use with a vehicle having a torsion bar suspension system, said gauge comprising a base bar, a rigid bracket extending laterally of and from one end of said base bar for fixing said base bar in a predetermined position on the vehicle to be gauged, clamping means adjustably mounted on the base bar for securing the gauge to the vehicle, a slidable scale member mounted upon said base bar for movement transversely thereof, a pair of probe blades at one end of said scale member for contact with a gauging point associated with said torsion bar suspension system, and means adjustably mounting said blades for movement relative to each other upon said scale member whereby the blades are selectively slidable transversely of the scale member into a first spaced position or a second abutting position.

4. The vehicle suspension height gauge of claim 3 wherein the blade mounting means comprises a pair of pins, each pin being fixed to a different one of said blades and being slidable in the other blade so that pressure on the exposed ends of the pins will move said blades apart and together into said first and second positions.

5. A vehicle suspension height gauge for use with a vehicle having a torsion bar suspension system, said gauge comprising a base bar, a rigid bracket extending laterally from one end of said base bar for positioning said base bar in a predetermined position on the vehicle to be gauged, clamping means adjustably mounted on the base bar for securing the gauge to the vehicle, a slidable scale member mounted upon said base bar for movement transversely thereof, a pair of opposed probe blades at one end of said scale member for contact with a gauging point associated with said torsion bar suspension system, spring means urging said scale member in one direction, latching means on said scale member operable against the urging of said spring means to retain said scale member in a fixed position on the base bar, a pin fixed to each probe blade and extending transversely therethrough, each of the pins being transversely slidably received in the blade in which it is slidably disposed, and means slidably mounting each end of each of the pins so that said blades are movable apart or together by applying pressure with thumb and forefinger on the oppositely projecting ends of the pins to make the blades selectively adjustable to straddle obstructions or to be received within a narrow passage on said vehicle.

6. A vehicle suspension height gauge for use with a vehicle having a torsion bar suspension system, said gauge comprising a base bar, means for mounting said base bar in a predetermined position on the vehicle to be gauged, a slidable scale member mounted upon said base bar for movement transversely thereof, two adjustable probe blades at one end of said scale member for contact with the proper gauging point associated with said torsion bar suspension system, a pin fixed to each probe blade and extending transversely therethrough, each of the pins being transversely slidably received in the blade to which it is not fixed, and means slidably mounting each end of each of the pins so that said blades are movable apart or together by applying pressure with thumb and forefinger on the oppositely projecting ends of the pins to adjust the blades to either straddle obstructions or be receivable within a narrow passage on said vehicle.

7. A vehicle suspension height gauge for use with a vehicle having a torsion bar suspension system, said gauge comprising a longitudinally adjustable base bar, rigid abutment members extending transversely from and at each end of said base bar for contacting said vehicle to place said base bar in a predetermined position thereon, clamping members at each end of said base bar for securing the gauge to said vehicle, said clamping members being adjustable in two directions perpendicular to the longitudinal axis of said base bar, and a pair of scale members slidably mounted upon said base bar for restrained sliding movement along the longitudinal axis thereof, each of said scaling members being also mounted upon said base bar for slidable movement transversely thereof for contact with the proper gauging points associated with said vehicle suspension system, said scaling members having at one end thereof a pair of probe blades which are adjustable in a manner wherein they can be moved apart to straddle an obstruction or moved together to form a single blade receivable within a narrow passage.

8. A vehicle suspension height gauge for use with a vehicle having a torsion bar suspension system, said gauge comprising a base bar, rigid abutment members extending transversely from and at each end of said base bar for contacting said vehicle to place said base bar in a predetermined position thereon, adjustable clamping members at each end of said base bar for securing the gauge to said vehicle, a pair of scale members mounted upon said base bar at spaced positions for slidable movement transversely of the base bar, two adjustable probe blades mounted in opposed relation at one end of each of said scaling members for contact with the proper gauging points associated with said torsion bar suspension system, a pin fixed to each probe blade and extending transversely therethrough, each of the pins being transversely slidably received in the corresponding opposed blade to which it is not fixed, and means slidably mounting each end of the pins so that said blades are movable apart or together by applying pressure with thumb and forefinger on the oppositely projecting ends of each pair of pins to adjust the blades for various obstructions encountered at said proper gauging points.

9. A vehicle suspension height gauge for use with a vehicle having a torsion bar suspension system, said gauge comprising a base bar, a rigid bracket extending laterally of and from one end of said base bar for fixing said base bar in a predetermined position on the vehicle to be gauged, measuring means slidably mounted upon said bar for movement transversely thereof, said measuring means having probing elements at one end for contact with the proper gauging point on the vehicle associated with said torsion bar suspension system, and a clamping member mounted on said bar for securing the gauge to the vehicle, said clamping member being slidably adjustable transversely of said bar and including a pair of opposed gripping hook members, each of said hook members having a plurality of teeth thereon for gripping portions of said vehicle.

10. A vehicle suspension height gauge for use with a vehicle having a torsion bar suspension system, said gauge comprising a base bar, a rigid bracket extending laterally of and from one end of said base bar for fixing said base bar in a predetermined position on the vehicle to be gauged, clamping means adjustably mounted on the base bar for securing the gauge to the vehicle, a slidable scale member mounted upon said base bar for movement transversely thereof, a pair of adjustable probe blades at one end of said scale member for contact with the proper gauging point associated with said torsion bar suspension system, spring means urging said scale member in one direction, latching means on said scale member operable against the urging of said spring means to retain said scale member in a fixed position on the base bar, said clamping means including a pair of opposed hook members spring urged inwardly, each of said hook members having a plurality of teeth thereon for gripping portions of said vehicle.

11. A vehicle suspension height gauge for use with a vehicle having a torsion bar suspension system, said gauge comprising a base bar, a rigid bracket extending laterally of and from one end of said base bar for fixing said base bar in a predetermined position on the vehicle to be gauged, clamping means mounted on the base bar for securing the gauge to the vehicle, said clamping means being slidably adjustable transversely of said bar and including a pair of opposed hook members, said hook members being spring-urged inwardly and having pockets formed thereon for engagement with portions of said vehicle, a slidable scale member mounted upon said base bar for movement transversely thereof, a pair of opposed probe blades at one end of said scale member for contact with the proper gauging point associated with said torsion bar suspension system, spring means urging said scale member in one direction, latching means on said scale member operable against the urging of said spring means to retain said scale member in a fixed position on the base bar so that said probe blades are in their lowermost position, a pin fixed to each probe blade and extending transversely therethrough, each of the pins being transversely slidably received in the blade to which it is not fixed, and means slidably mounting each end of each of the pins so that said blades are movable apart or together by applying pressure with thumb and forefinger on the oppositely projecting ends of the pins to make the blades adjustable to straddle obstructions or to be received within a narrow passage on said vehicle.

References Cited by the Examiner
UNITED STATES PATENTS

| | | | |
|---|---|---|---|
| 1,560,521 | 11/25 | Andrews | 33—193 |
| 2,086,402 | 7/37 | Countryman | 33—203 X |
| 2,853,790 | 9/58 | MacMillan | 33—203 X |
| 2,900,734 | 8/59 | Richards | 33—180 |
| 3,108,382 | 10/63 | Vorpahl | 33—180 X |
| 3,111,773 | 11/63 | Hunter | 33—193 X |

ISAAC LISANN, *Primary Examiner.*